(12) United States Patent
Hwang

(10) Patent No.: US 11,164,696 B2
(45) Date of Patent: Nov. 2, 2021

(54) LOW COMMON MODE NOISE TRANSFORMER STRUCTURE WITH EXTERNAL FLOAT WIRE MOUNT

(71) Applicant: Power Integrations, Inc., San Jose, CA (US)

(72) Inventor: Kyunghoon Hwang, Palo Alto, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 200 days.

(21) Appl. No.: 16/404,057

(22) Filed: May 6, 2019

(65) Prior Publication Data

US 2020/0357571 A1 Nov. 12, 2020
US 2021/0090795 A9 Mar. 25, 2021

Related U.S. Application Data

(63) Continuation of application No. PCT/US2017/060237, filed on Nov. 6, 2017.

(Continued)

(51) Int. Cl.
*H01F 27/38* (2006.01)
*H01F 27/28* (2006.01)
(Continued)

(52) U.S. Cl.
CPC ............. *H01F 27/38* (2013.01); *H01F 27/24* (2013.01); *H01F 27/2804* (2013.01);
(Continued)

(58) Field of Classification Search
CPC ........ H01F 27/24; H01F 27/289; H01F 27/29; H01F 27/325; H01F 27/38;
(Continued)

(56) References Cited

U.S. PATENT DOCUMENTS 5,150,046 A 9/1992 Lim
7,768,369 B2 * 8/2010 Park .................. H01F 27/345
336/84 C (Continued)

OTHER PUBLICATIONS

PCT International Search Report and Written Opinion of the ISA dated Jan. 30, 2018, for International Application No. PCT/US2017/060237; 16 pages in all.

(Continued)

*Primary Examiner* — Matthew V Nguyen
(74) *Attorney, Agent, or Firm* — Power Integrations, Inc.

(57) ABSTRACT

A transformer structure is disclosed to reduce common mode noise on an output load. The transformer structure includes a bobbin mounted on a magnetic core, a plurality of windings wound around the bobbin. The plurality of windings include a primary winding coupled to receive an input voltage, a secondary winding coupled to an output load; and a floating auxiliary winding located between the primary and secondary winding. The floating auxiliary winding includes a first terminal and a second terminal coupled to a pair of external float wires extended towards an isolation mounting (Continued)

sheet placed adjacent to an exterior top surface of the transformer structure. The pair of external float wires forms parallel adjacent and open-ended conductive traces with a predefined pattern on the isolation mounting sheet placed above the exterior surface of the transformer structure.

21 Claims, 5 Drawing Sheets

Related U.S. Application Data

(60) Provisional application No. 62/419,139, filed on Nov. 8, 2016.

(51) Int. Cl.
  *H01F 27/24* (2006.01)
  *H02M 3/335* (2006.01)
  *H01F 27/32* (2006.01)
  *H01F 27/29* (2006.01)

(52) U.S. Cl.
  CPC ............ *H01F 27/289* (2013.01); *H01F 27/29* (2013.01); *H01F 27/325* (2013.01); *H02M 3/33507* (2013.01)

(58) Field of Classification Search
  CPC ....... H02F 27/2804; H02M 1/32; H02M 1/44; H02M 3/335; H02M 3/33507; H02M 3/33523

See application file for complete search history.

(56) References Cited

U.S. PATENT DOCUMENTS

| | | |
|---|---|---|
| 8,023,294 B2 * | 9/2011 | Ryan ................ H02M 1/14 363/40 |
| 2007/0152794 A1 | 7/2007 | Chen |
| 2010/0232182 A1 * | 9/2010 | Yang ................ H02M 3/33569 363/20 |
| 2012/0223795 A1 | 9/2012 | Hester |
| 2013/0314071 A1 * | 11/2013 | Marriott ................ H01F 27/42 323/357 |
| 2014/0185337 A1 | 7/2014 | Espino |
| 2019/0238048 A1 * | 8/2019 | Chou ................ H02M 1/32 |

OTHER PUBLICATIONS

"International Application No. PCT/US2017/060237—International Search Report and Written Opinion, dated Jan. 30, 2018", 16 pages.

Chinese Application No. 201780069219.9; First Office Action with English Translation; dated Jan. 13, 2021; 15 pages.

Chinese Application No. 201780069219.9; First Search Report; dated Dec. 28, 2020; 2 pgs.

* cited by examiner

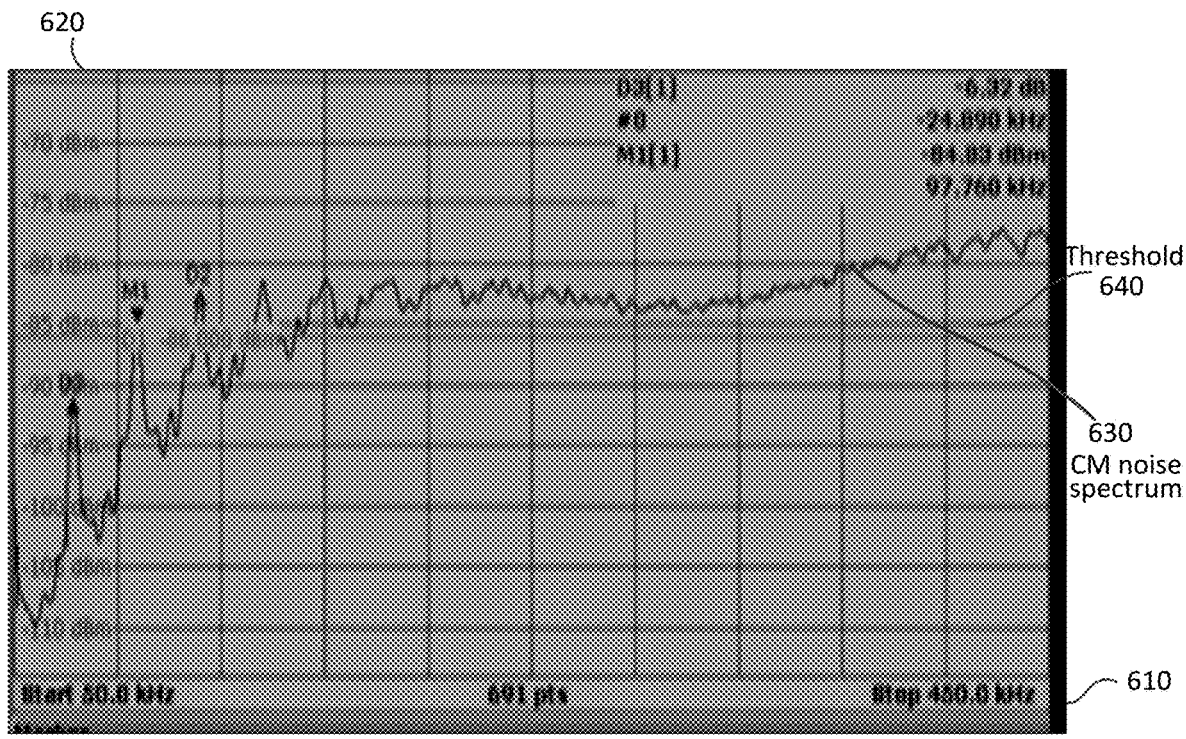
FIG. 6A CM noise measured at output without the float wires externally extended on the mounting surface (with 100pF Y-cap)
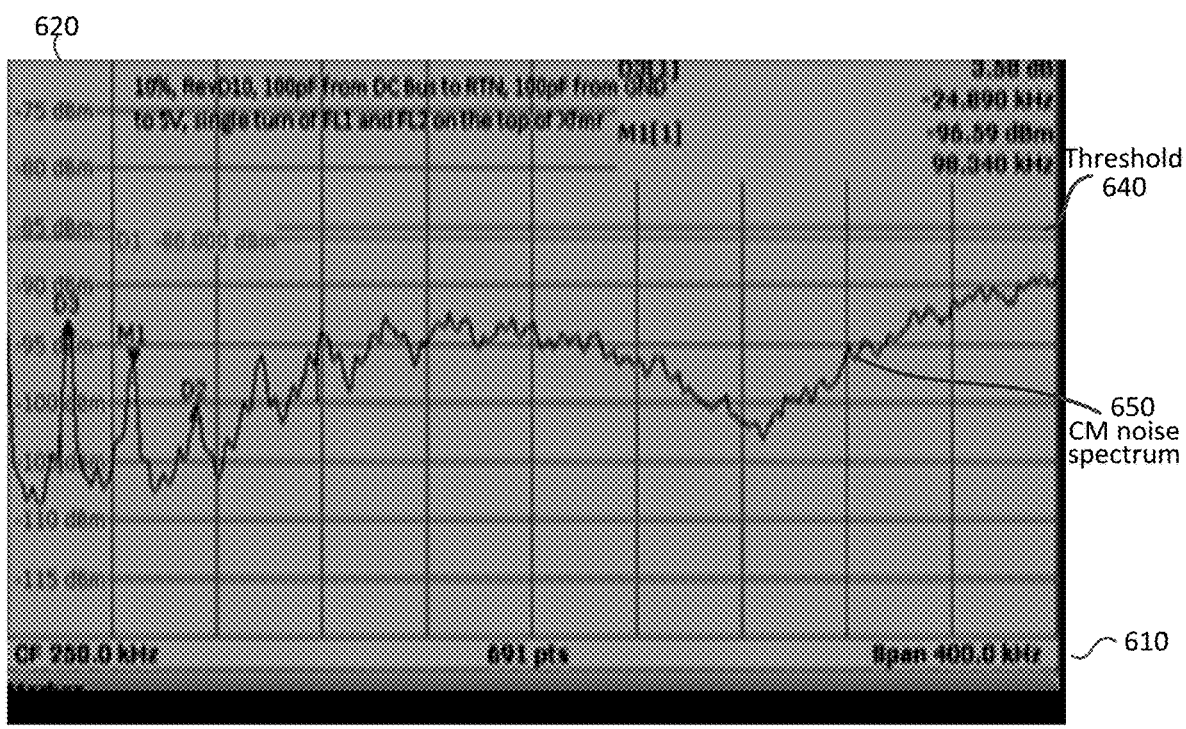
FIG. 6B CM noise measured at output with the rectangular shaped float wires externally extended on the mounting surface (with two locations 100pF Y-cap)

LOW COMMON MODE NOISE TRANSFORMER STRUCTURE WITH EXTERNAL FLOAT WIRE MOUNT

CROSS-REFERENCE TO RELATED APPLICATION

The application claims the benefit of International Application PCT/US2017/060237 filed on Nov. 6, 2017, which claims the benefit of U.S. Provisional Application No. 62/419,139 filed Nov. 8, 2016, the contents of which are incorporated herein by reference in its their entirety.

BACKGROUND INFORMATION

Field of the Disclosure

The present invention relates generally to power supplies and reducing the effect of common mode (CM) noise on the output load. In particular, but not exclusively, it relates to a modified structure of a transformer to cancel, compensate or redirect CM noise from affecting the output signals.

Background

Many electrical devices such as cell phones, personal digital assistants (PDA's), laptops, etc. need a source of dc power. Because power is generally delivered through a wall outlet as high-voltage ac power, a device, typically referred to as a power supply, is required to convert the high-voltage ac power to usable dc power for many electrical devices. Moreover, the power supply often must provide a type of electrical isolation between the source of high voltage ac power and the dc power to meet the requirements of safety agencies. The usable dc power may be provided by the power supply directly to the device or it may be used to charge a rechargeable battery that, in turn, provides energy to the device, which requires charging once stored energy is drained. In operation, a power supply may use a controller to regulate output power delivered to an electrical device that may be generally referred to as a load. The controller regulates the transfer of energy to the load. In one instance a controller may control a power switch to turn on and off in response to feedback information from a sensor to transfer energy pulses to the output from the high-voltage ac power source.

A power supply typically must limit noise current in its input conductors to meet the limits specified by regulatory agencies. Current that has the same magnitude and direction (toward the power supply or away from the power supply) in two or more conductors at the same time is called common mode current. Current that has the same magnitude but opposite directions in two conductors is called differential current.

The common mode current in the input conductors is generally a noise current that does not contribute to the power received by the power supply, whereas the differential current provided by the input voltage source delivers the power received by the power supply. Common mode current originates chiefly from the fast switching of high voltage in the power supply. The displacement current that is created by the changing voltage returns to its place of origin on a path that includes the input conductors of the power supply, and therefore contributes to the noise current that is limited by regulatory agencies.

One way to reduce the common mode current is to place inductive components in the input conductors. These components are sometimes referred to as common mode inductors or as common mode chokes. A common mode inductor may have two or more windings on a common magnetic core where the windings are configured to oppose common mode noise currents that would flow in the same direction in the input conductors while offering negligible opposition to differential currents that provide power to the power supply. A preferred alternative to the use of common mode inductors in the input conductors is to add special windings to an energy transfer element that is already in the power supply for power conversion purposes.

The energy transfer element in the power supply, sometimes called a transformer, is an inductive component with multiple windings on a magnetic core. During operation the transformer allows the transfer of energy between an input side (referred to as a primary side) of the power supply and an output side (referred to as the secondary side) of the power supply. The transformer also provides galvanic isolation between the input and an output of the power supply. Galvanic isolation is a property that prevents dc current from flowing between an input conductor and an output conductor. However, during fast changes of electric field a capacitive current may be transferred across a galvanic isolation. A winding necessary for power conversion is a power winding. Additional windings that do not take part in the power conversion function may be called "Special windings" such as balance winding, cancellation winding or shield winding. Some windings may provide both shielding functions and power conversion functions, such as for example a bias winding that may serve as a shield winding and as well provide a supply voltage for a control circuit.

The purpose of the special windings is to restrict the displacement current to a path that does not include the input conductors of the power supply. It is preferred that displacement current remains within the energy transfer element, and that the equivalent conduction current does not go very far beyond the terminals of the energy transfer element. The special windings accomplish their purpose by introducing electric fields at the proper place and in the proper strength to steer the displacement current to take a desired path.

Well-known methods have been developed to design and to construct energy transfer elements (in other words transformers) that contain shield windings for the purpose of reducing common mode current in power supplies. For some application for instance when a winding of the energy transfer element has a small number of turns it may be impossible to give a conventional shielding effect and the desired reduction in displacement current. As well when the load has extra sensitivity to level of CM noise, for example in capacitive sensors of touch screen devices, these methods encounter difficulties.

Common mode current may flow in phase in both supply wires of a power board in the same direction. The common mode current returns to ground via distributed parasitic capacitance of each wire to ground. The CM currents generate magnetic fields with equal magnitude and polarity which do not cancel each other out and acts like an antenna generating Radio Frequency Interference RFI. An ideal transformer is considered as a perfect circuit element that transfers electrical energy between primary and secondary windings by the action of perfect magnetic coupling. The ideal transformer will only transfer alternating, differential mode current. Common mode current will not be transferred because it results in a zero potential difference across the transformer windings and therefore does not generate any magnetic field in the transformer windings. Any real transformer will have a small, but non-zero capacitance linking primary to secondary windings. The capacitance is a result of the physical spacing and the presence of a dielectric between the windings. The size of this interwinding capacitance can be reduced by increasing the separation between the windings, and by using a low permittivity material to fill the space between the windings. For common-mode current, interwinding capacitance offers a path across the transformer, the impedance of which is dependent on the magnitude of the capacitance and the signal frequency.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6A illustrates test results of CM noise measurement at the output of a charger adapter before utilizing the invention transformer structure in accordance with the teachings of the present invention.

FIG. 6B illustrates test results of CM noise measurement at the output of a charger adapter with the assembled transformer and isolated mounting sheet in accordance with the teachings of the present invention.

Figure 1:
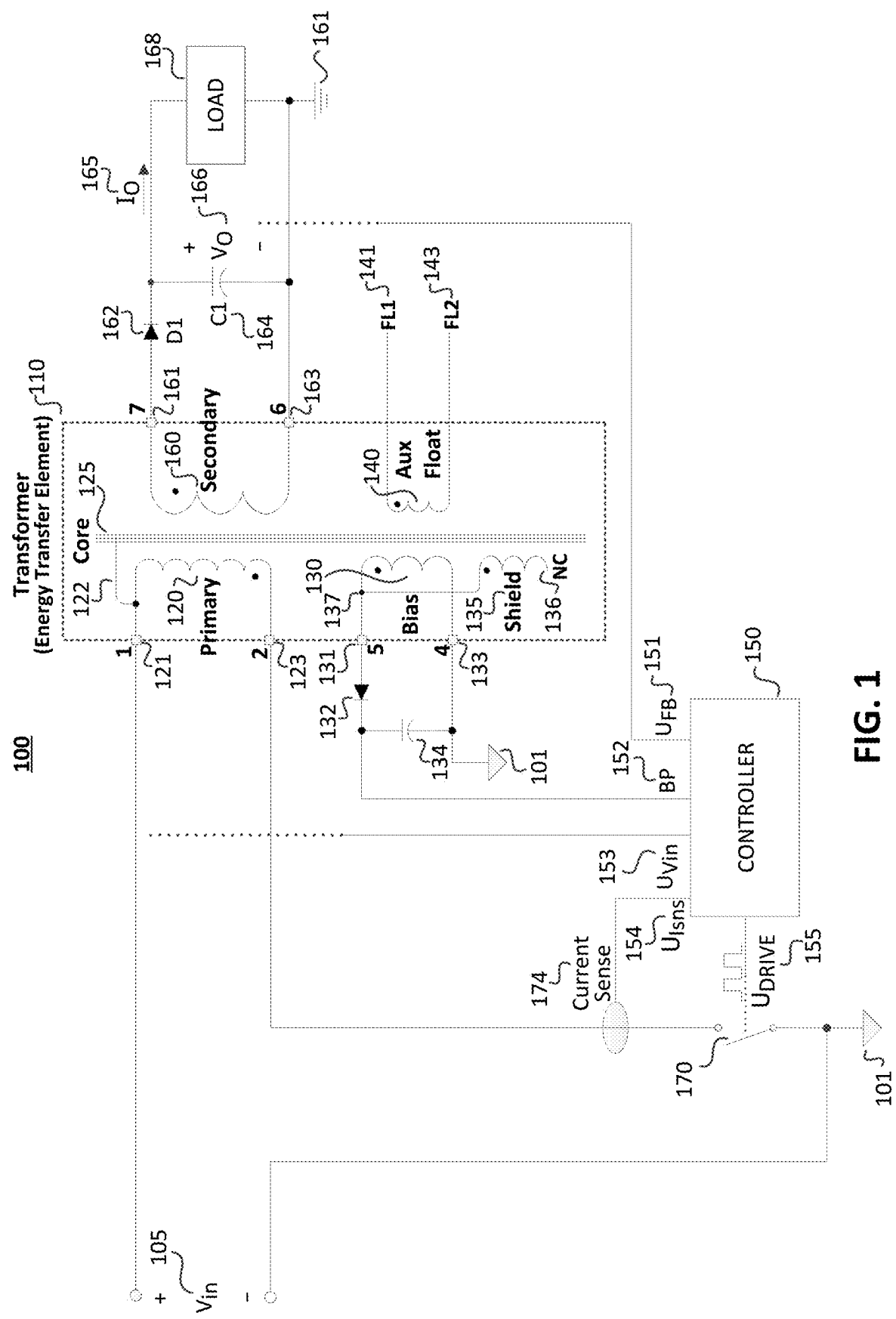
FIG. 1 is an example circuit diagram of a flyback switching regulator with a low a transformer with an external mount float wire in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a transformer reducing a common mode noise to the output load in power converters are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For purposes of this disclosure, "ground" or "ground potential" refers to a reference voltage or potential against which all other voltages or potentials of a circuit or integrated circuit (IC) are defined or measured.

A power circuit board is a board on which the power components are located. Power circuit boards may easily be exposed to CM noise that is generated and may be transferred through ground reference to both lines through their distributed capacitance to ground. This undesirable generated noise may affect many functions on the board and on the output load.

In some specific application such as touch screen devices the disclosed modification of transformer structure presented in this application may reduce common mode noise and improve performance by more accurate detection of touch signals on a touch screen. In other applications, the modification of the transformer structure presented in this application may cancel, compensate or redirect the CM noise FIG. 1 illustrates an example circuit diagram of a flyback switching regulator (power converter) 100 utilizing a low common mode noise transformer with external mount float wires according to present disclosure.

The flyback switching regulator includes a transformer 110, a controller 150, a power switch 170, a rectifier 162, an output capacitor C1 164 and a load 168.

In one example, the transformer 110 may be referred to as an energy transfer element. The energy transfer element 110 further includes a primary winding 120 coupled to the input voltage $V_{IN}$ 105 through a switching element (power switch) 170. A high potential terminal of primary winding 120 is electrically coupled to a conductive link 122, and is further coupled to the core 125 (equi-potential). In one example the input voltage $V_{IN}$ 105 may be the rectified and filtered voltage from an ac line (50-60 Hz) through an input bridge rectifier (not shown). The power switch 170 is controlled by a drive signal $U_{DRIVE}$ 155 from the controller 150 to regulate the transfer of energy from input to an output load.

Controller 150 is coupled to receive a current sense signal $U_{Isns}$ 154 representative of the sensed current 174 through power switch 170, an input voltage sense signal $U_{Vin}$ 153 representative of the input voltage $V_{in}$ 105 and a feedback signal $U_{FB}$ 151 from output of the switching regulator. Furthermore, controller 150 is coupled to receive a supply voltage on terminal BP 152 which in one example may be through a bias winding 130 on transformer 110. The supply voltage is generated by the induced ac voltage on the bias winding which is rectified through rectifier 132, filtered by capacitor 134 and applied to the terminal BP 152 of the controller 150 in reference to primary ground 101.

In operation, the ac energy received by the secondary winding 160 from the primary winding 120 of the energy transfer element 110 is rectified through diode D1 162 and filtered by output capacitor C1 164 to provide regulated output across the load 168. The load 168 may be regulated either through the output voltage $V_O$ 166 or the output current $I_O$ 165, or a combination on both. The dot polarity shows the polarity of the voltage between the ends of the windings. All ends with the dot have the same polarity with respect to the end without the dot. The end with the dot may be positive or negative, depending whether the power switch is ON or OFF. In other words, when the dotted end of one winding is positive with respect to its non-dotted end, the dotted end of every other winding will be positive with respect to its non-dotted end, and when the dotted end of one winding is negative with respect to its non-dotted end, the dotted end of every other winding will be negative with respect to its non-dotted end. The stored energy in primary winding 120 of the transformer 110 may only be transferred to the output capacitor 164 when power switch 170 is in off state (open and not conducting).

FIG. 1 further includes a shield winding 135 with a first end coupled to terminal 5 131 of the bias winding 130 and second end NC 136 includes no electrical connection.

Transformer 110 further includes an auxiliary winding 140 with float terminals FL1 141 and FL2 142. By extending wires from the float terminals FL1 141 and FL2 142, an external flat frame could be formed on an isolation sheet (e.g., a small piece of blank circuit board) and mounted on the top of the transformer as will be described in FIG. 3.

Figure 2:
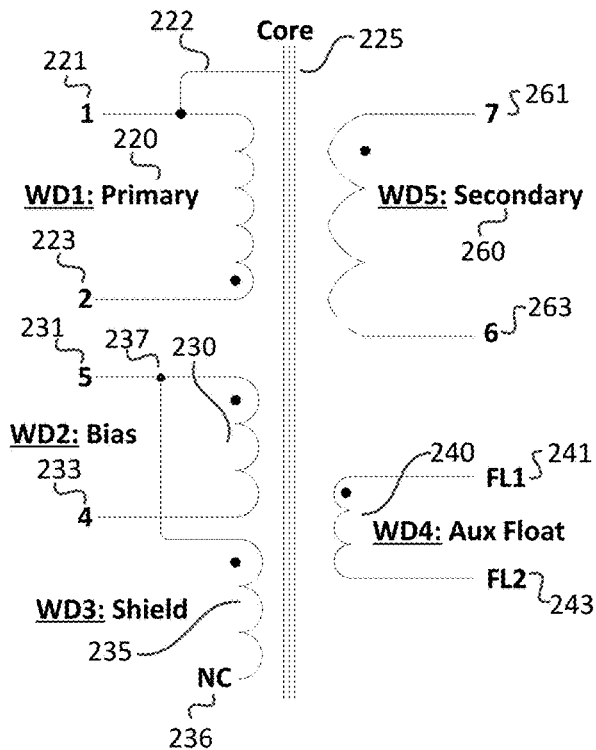
FIG. 2 is an electrical diagram of a transformer with an auxiliary float winding to be coupled to external float wires in accordance with the teachings of the present invention.

FIG. 2 shows an example electrical schematic of the windings for the example transformer in FIG. 1. The windings of the transformer are further labeled with WD1, WD2, WD3 etc. The WD nomenclature refers to a winding diagram, which is used to denote the location of the winding relative to the core. For example, WD1 is the winding located closest to the core, whereas WD2 is the winding located next to WD1.

Primary winding WD1 220 includes a terminal 221 coupled to the input line with higher potential that is electrically coupled to the core 225 by conductive link 222. Terminal 223 of the primary winding WD1 220 is coupled to the switching element (e.g., power switch 170 in FIG. 1). Terminals 261 and 263 of the secondary winding 260 are coupled to output circuitry of the flyback switching regulator as illustrated in FIG. 1.

The bias winding WD2 230 has the same dot polarity as the secondary winding WD5 260 and includes terminals 231 and 233. As mentioned previously, the bias winding WD2 230 is coupled to generate a dc supply for the controller of the flyback switching regulator as mentioned in FIG. 1.

A float shield winding WD3 235 (in one example consisting of one or more turns) is coupled to the high side (high potential) terminal 231 of the bias winding WD2 230 by conductive link 237. Terminal NC 236 of the shield winding WD3 235 includes no electrical connection.

The auxiliary float winding WD4 240 has the same dot polarity as the secondary winding WD5 260. The two terminals FL1 241 and FL2 243 of the auxiliary float winding WD4 240 are not electrically coupled to any point of transformer or to any other node of the flyback switching regulator.

Figure 3:
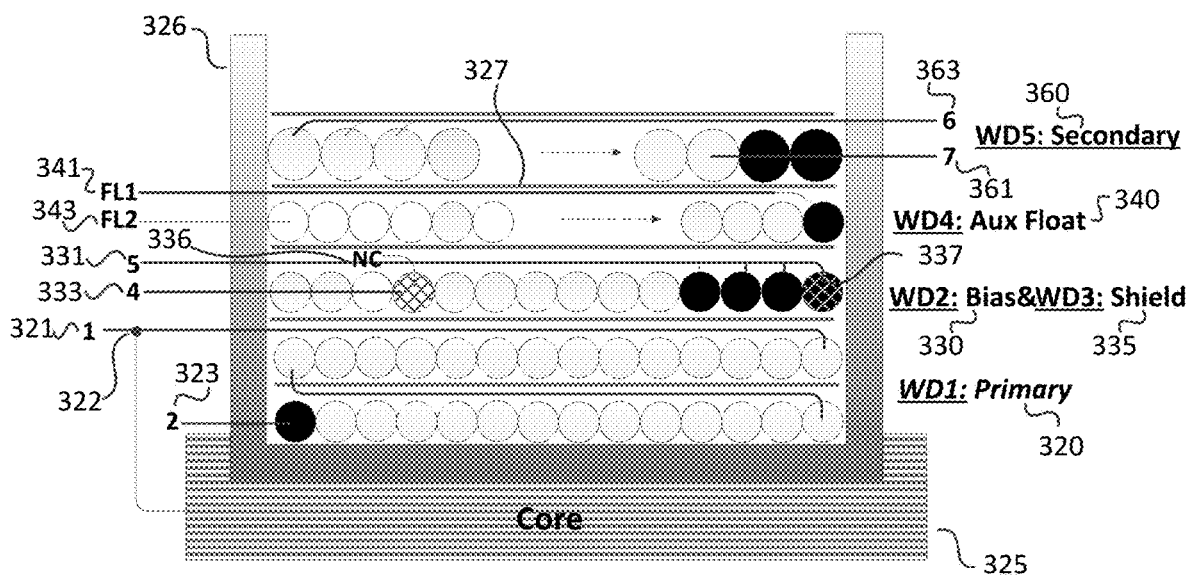
FIG. 3 is a cross section of the transformer represented in the schematic of FIG. 2 in accordance with the teachings of the present invention.

FIG. 3 illustrates a cross section of the windings for the transformer represented in the schematic of FIG. 2. The cross section shows the arrangement of wire that would form coils around a magnetic core 325 with relatively high permeability, where the bottom winding would be closest to the core. The solid black circles in FIG. 2 indicate the dotted ends of the windings. For instance a single solid circle indicates the beginning of a single-wire winding. Two adjacent solid black circles indicate a winding with two strands of wire side-by-side (a bifilar winding). A bifilar winding is generally an untwisted pair of insulated wires wound together from start to finish. Multi-filar winding techniques may reduce the size and improve the performance of transformers that operate at relatively high currents.

FIG. 3 includes a bobbin 326, two layers of the primary winding 320, a layer of the combined bias winding 330 and shield winding 335, a layer of the auxiliary float winding 340, and a layer of a secondary winding 360. Layers of isolation tape separate layers of different windings (e.g., isolation tape 327 separates auxiliary float winding 340 from the secondary winding 360). In one example, the two layers of the primary winding are wound in a Z configuration (zigzag or z-wound). In other examples, the first and second layers can be in a C configuration (c-wound). A z-wound configuration may be used in applications where lower transformer capacitance is required, whereas a c-wound may be used in applications for simpler transformer constructions.

The first layer of the primary winding 320 includes a terminal 323 coupled to a switching element as shown in FIG. 1. The second layer of the primary winding 320 includes a terminal 321 that is coupled to the core 325 by a conductive link 322. The layer of the combined bias winding and shield winding comprises of a multi-filar winding wherein one strand of the multi-filar winding includes no electrical connection as indicated by the no connection terminal NC 336. The black etched circle refers to a single turn of the shield layer, and wherein the solid black circles refer to multiple turns of the bias layer.

The layer of auxiliary winding includes a first float terminal 341 and a second float terminal 343. The first float terminal 341 and second float terminal 343 have no electrical connection, and may only include a capacitive coupling to the other windings, core 325, and to other conductive parts of the transformer. The float terminals 341 and 343 of the auxiliary float winding 340 based on teaching of present disclosure could be externally extended to a mount isolation sheet on top of the transformer to form a path with distributed capacitance to nearby conductive parts to compensate, block or redirect the undesirably modulated CM noise. The layer of secondary winding 360 includes a sixth terminal 363, a seventh terminal 361, and comprises of a tri-filar winding.

It is appreciated that the transformer structure of FIGS. 2 and 3 are only illustrated as examples and the low common mode noise transformer structure with an external float wire based on teaching of present disclosure may be used in any topology other than flyback and with any required design of transformer winding sequencing, winding styles or number of winding strands.

Figure 4A:
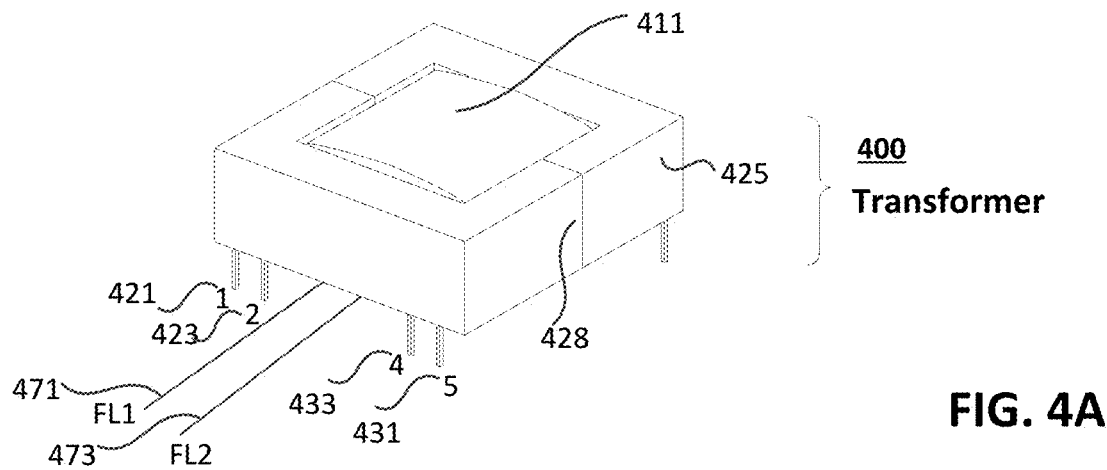
FIG. 4A illustrates an assembled transformer in accordance with the teachings of the present invention.

FIG. 4A illustrates a three-dimensional view of an assembled transformer 400 wherein all layers of windings 410 are wound on the bobbin as described in FIG. 3. In one example, the bobbin is a horizontal bobbin with an EE shape magnetic core. Furthermore, the core includes an adjusted air gap 428 to tune the inductance and produces fringe flux around the gap area.

The terminals of each winding coincide with and are connected with the pins of the bobbin. For example the first pin 421 and second pin 423 connects with the first terminal 321 and second terminal 323 of primary winding WD1 320 in FIG. 3. Furthermore, the fifth pin 431 and fourth pin 433 connects with the fifth terminal 331 and fourth terminal 333 of the bias winding 330 and shield winding 335 in FIG. 3 which are wound together on a single layer (e.g., the third layer). It is appreciated that to avoid cluttering of these figures, the other pins of the bobbin with their related winding terminal connections are not shown. The two float wires/terminals FL1 471 and FL2 473 of the auxiliary float winding (e.g., WD4 340 in FIG. 3) are extended out without any bobbin pin connection.

It is appreciated that in one embodiment, to save on an extra auxiliary float winding on the core, the pair of float (open ended) wires FL1 471 and FL2 473 may be extended from the ac terminals of the bias winding with some partial effect on the CM noise cancellation. However, an individual auxiliary float winding with a tuned number of turns may provide an optimal effect on the CM noise cancellation.

Figure 4B:
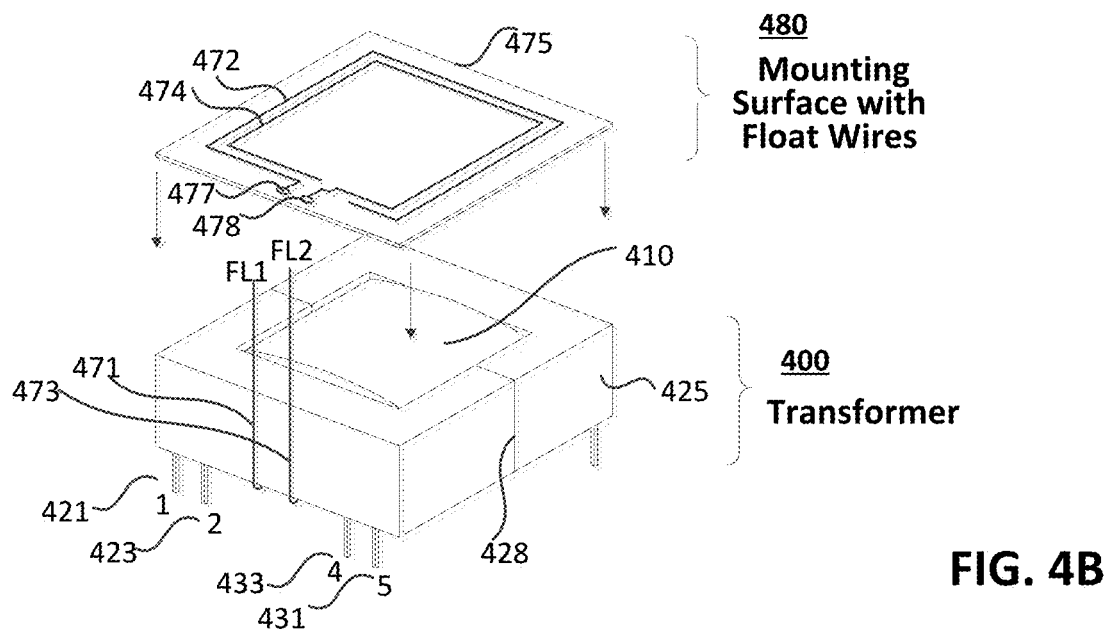
FIG. 4B illustrates an isolated mounting sheet with external float wires and an assembled transformer in accordance with the teachings of the present invention.

FIG. 4B shows transformer 400 of FIG. 4A and a mounting isolation sheet with extended float wires 480. The isolation mounting sheet 475 in one example may be a piece of circuit board material with an area almost equal to the top surface of the transformer 400. The isolation mounting sheet 475 includes two parallel adjacent and open-ended conductive traces 472 and 474 shaped with a predefined pattern. In another example, there may be 2 times N parallel adjacent and open-ended conductive traces. In example of FIG. 4B, the pair of open-ended conductive traces 472 and 474 are formed above the core area as rectangular shape aligned near the sides of the isolation mounting sheet 475 (near the edge lines of the mounting board). The two externally extended float wires 471 and 473 from the auxiliary float winding terminals are connected to the start points 477 and 478 of the two open-ended conductive traces 472 and 474.

In one example, the isolation sheet to form the predefined pattern of open-ended conductive traces 472 and 474 could be made of a meshed isolation sheet or in a frame shape with an empty space at the middle of the sheet to facilitate heat exchange of the windings beneath the isolation sheet.

Figure 4C:
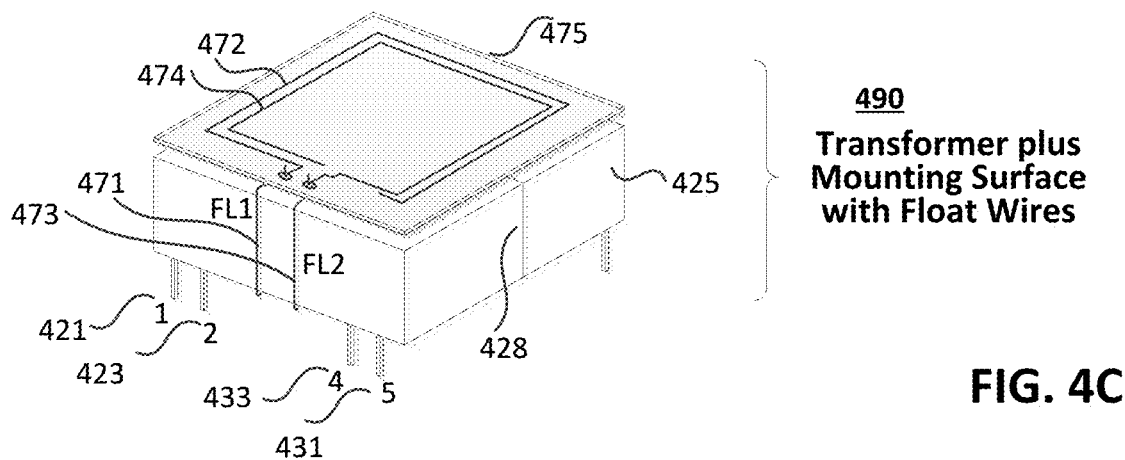
FIG. 4C illustrates an isolated mounting sheet on top of an assembled transformer in accordance with the teachings of the present invention.

FIG. 4C illustrates the completed transformer 490 including the mounting surface with extended float wires on its top surface (400 plus 480) when float wires 471 and 473 are connected to the start points 477 and 478 of the two open-ended conductive traces 472 and 474. In one example the two open-ended conductive traces 472 and 474 are the same length paralleled with a small distance from each other along the sides of the isolation mounting sheet.

Figure 5C:
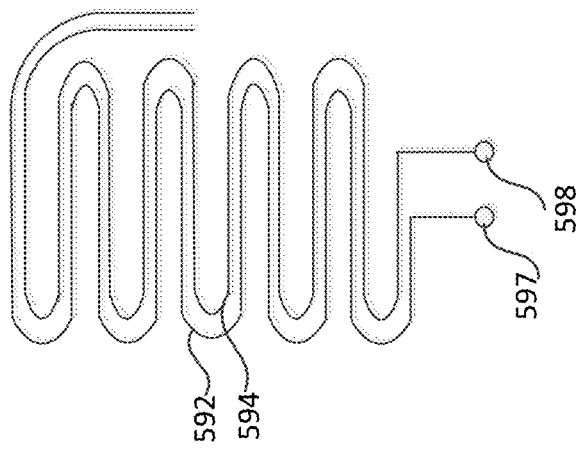
FIG. 5C illustrates a further example of a pair of open-ended conductive trace on the isolated mounting sheet in accordance with the teachings of the present invention.
Figure 5B:
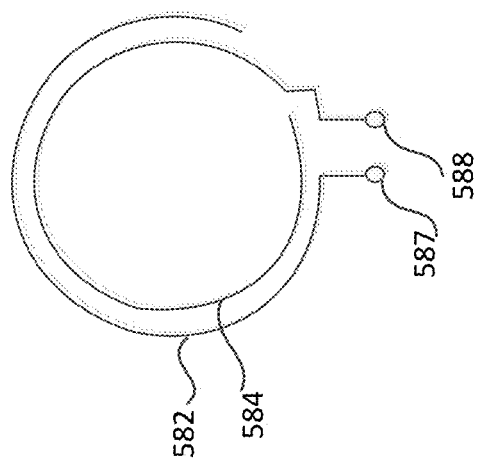
FIG. 5B illustrates another example of a pair of open-ended conductive traces on the isolated mounting sheet in accordance with the teachings of the present invention.
Figure 5A:
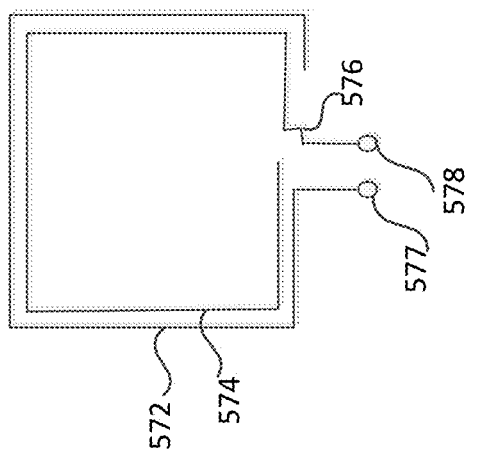
FIG. 5A illustrates an example of a pair of open-ended conductive traces on the isolated mounting sheet in accordance with the teachings of the present invention.

FIGS. 5A, B and C show other suggested and possible predefined patterns/shapes of the open-ended conductive traces formed by the extended float wires on the isolation mounting sheet on top of the transformer to cancel, compensate or redirect the CM noise to prevent interrupting the sensitive sensors (e.g., in capacitive sensors of a touch screen load device) by reducing the noise to signal ratio (increase of signal to noise ratio).

FIG. 5A illustrates the rectangular shaped conductive traces presented previously in FIGS. 4B and 4C with an outer float trace 572 and an inner float trace 574 with respective start points 577 and 578 to connect the float wires FL1 471 and FL2 473 from the auxiliary float winding 340 of the transformer. To achieve symmetry of the capacitive coupling for the two inner and outer conductive float traces two adjacent parallel conductive traces are of the equal length; therefore the inner trace may include a dent 576 and the outer trace may end at a longer distance from its start point.

FIG. 5B illustrates a circular shaped open-ended float conductive traces with an outer float trace 582 and an inner float trace 584 with equal length of traces and respective start points 587 and 588. FIG. 5C illustrates yet another possible pattern/shape with symmetric curves for the two equal length open-ended conductive traces 592 and 594 that could be formed by the extended float wires on the isolation mounting sheet and with respective start points 597 and 598.

FIGS. 6A and 6B present some test results of CM noise measurement at output of a charger adapter (for instance with a flyback configuration as shown in FIG. 1). FIGS. 6A and 6B show the CM noise spectrum from 50 kHz to 450 kHz (on horizontal axis 610) that is the main spectral range of CM interruption on the touch screen devices. FIG. 6A illustrates on the vertical axis 620 the test result of CM noise measurement in dBm units (decibel milliwatt of noise to signal ratio), without applying the extended float wires on the isolation mounting sheet (with 100 pF Y-cap from each line to ground). The test result of FIG. 6A illustrates the CM noise spectrum 630 exceeding a threshold level 640 (in one example defined in the product's specification or regulatory specification; e.g., −85 dBm). The local peaks in the low end of the spectral are due to harmonics of the switching frequency.

FIG. 6B illustrates test results after applying the extended float wires on the isolation mounting sheet (with two locations of 100 pF Y-caps from each line to ground). In this example, the CM noise spectral spectrum 650 has been decreased to below the specification defined threshold level 660 (e.g., −85 dBm).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A transformer structure configured to reduce a common mode noise on an output load, comprising:
   a bobbin mounted on a magnetic core;
   a plurality of windings wound around the bobbin, the plurality of windings comprising:
      a primary winding;
      a secondary winding; and
      a floating auxiliary winding located between the primary winding and the secondary winding, the floating auxiliary winding including a first terminal and a second terminal, wherein the common mode noise is reduced when the first terminal and the second terminal are coupled to a pair of external float wires extended towards an isolation mounting sheet placed adjacent to an exterior surface of the transformer structure, the pair of external float wires forming parallel adjacent and open-ended conductive traces with a predefined pattern on the isolation mounting sheet placed on the exterior surface of the transformer structure.

2. The transformer structure of claim 1, wherein the isolation mounting sheet is made of a circuit board material.

3. The transformer structure of claim 1, wherein the bobbin is a horizontal bobbin.

4. The transformer structure of claim 1, wherein the magnetic core is an EE shape magnetic core with an adjusted air gap.

5. The transformer structure of claim 1, wherein the predefined pattern on the isolation mounting sheet is above a top surface of the magnetic core.

6. The transformer structure of claim 5, wherein the predefined pattern is a rectangular shape.

7. The transformer structure of claim 5, wherein the predefined pattern is a circular shape.

8. The transformer structure of claim 5, wherein the predefined pattern is a symmetric curve.

9. The transformer structure of claim 1, further comprising a bias winding made of a multi-filar wire.

10. The transformer structure of claim 9, further comprising a shield float winding wound on a same layer as the bias winding, wherein the shield float winding comprises of one or more strands of the multi-filar wire.

11. The transformer structure of claim 1, wherein a high potential terminal of the primary winding is coupled to the magnetic core by a conductive link.

12. A flyback power converter comprising:
    a transformer structure coupled between an input of the flyback power converter and an output of the flyback power converter, the transformer structure comprising:
       a bobbin mounted on a magnetic core;
       a plurality of windings wound around the bobbin, the plurality of windings comprising:
          a primary winding;
          a secondary winding;
          a floating auxiliary winding located between the primary winding and the secondary winding, the floating auxiliary winding including:
             a first terminal and a second terminal coupled to a pair of external float wires extended towards an isolation mounting sheet placed adjacent to an exterior surface of the transformer structure, the pair of external float wires forming parallel adjacent and open-ended conductive traces with a predefined pattern on the isolation mounting sheet placed on the exterior surface of the transformer structure, wherein the first terminal and the second terminal are not electrically coupled to a node of the flyback power converter;
    a switching element coupled to the primary winding and the input of the flyback power converter; and
    a controller coupled to the switching element, the controller configured to generate a drive signal to control switching of the switching element.

13. The flyback power converter of claim 12, further comprising a bias winding coupled to generate a supply voltage to the controller.

14. The flyback power converter of claim 13, wherein the bias winding is made of a multi-filar wire.

15. The flyback power converter of claim 14, further comprising a shield float winding wound on a same layer as the bias winding, wherein the shield float winding consists of one or more strands of the multi-filar wire.

16. The flyback power converter of claim 12, further comprising an EE shape magnetic core with an adjusted air gap.

17. The flyback power converter of claim 12, wherein the predefined pattern on the isolation mounting sheet is above a top surface of the magnetic core.

18. The flyback power converter of claim 17, wherein the predefined pattern is a rectangular shape.

19. The flyback power converter of claim 17, wherein the predefined pattern is a circular shape.

20. The flyback power converter of claim 17, wherein the predefined pattern is a symmetric curve.

21. The flyback power converter of claim 12, wherein a high potential terminal of the primary winding is further coupled to the magnetic core by a conductive link.

* * * * *